(12) United States Patent
Hemmi (10) Patent No.: US 12,460,471 B2
(45) Date of Patent: Nov. 4, 2025

(54) MASS SPECTROMETER (71) Applicant: SHIMADZU CORPORATION, Kyoto (JP)

(72) Inventor: Tetsuya Hemmi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 456 days.

(21) Appl. No.: 17/918,655

(22) PCT Filed: Feb. 4, 2021

(86) PCT No.: PCT/JP2021/004092
§ 371 (c)(1),
(2) Date: Oct. 13, 2022

(87) PCT Pub. No.: WO2021/229870
PCT Pub. Date: Nov. 18, 2021

(65) Prior Publication Data
US 2023/0147319 A1 May 11, 2023

(30) Foreign Application Priority Data
May 14, 2020 (JP) .................................. 2020-085214

(51) Int. Cl.
*E06B 5/00* (2006.01)
*E06B 7/16* (2006.01)
(Continued)

(52) U.S. Cl.
CPC .................. *E06B 5/00* (2013.01); *E06B 7/16* (2013.01); *G01N 30/7206* (2013.01); *H01J 49/0422* (2013.01)

(58) Field of Classification Search
CPC ......... E06B 5/00; E06B 7/16; G01N 30/7206; G01N 30/72; G01N 27/62; H01J 49/0422; H01J 49/24
See application file for complete search history.

(56) References Cited

U.S. PATENT DOCUMENTS 6,263,542 B1 * 7/2001 Larson .................. E05D 11/084
49/386
2002/0130288 A1 * 9/2002 Duelli ........................ F16K 3/18
251/158
(Continued)

FOREIGN PATENT DOCUMENTS

JP   2002-250470 A   9/2002
JP   2003-346703 A   12/2003
JP   2008-518214 A   5/2008

OTHER PUBLICATIONS

International Search Report for PCT/JP2021/004092 dated Apr. 20, 2021.
(Continued)

*Primary Examiner* — Robert H Kim
*Assistant Examiner* — Laura Eloise Tandy
(74) *Attorney, Agent, or Firm* — Sughrue Mion, PLLC (57) ABSTRACT

A door 4 includes a closing portion 41 that closes an opening 302 in a closed state, and a holding portion 42 that holds the closing portion 41 and is connected to a hinge portion 5. The closing portion 41 is connected to the holding portion 42 on the side opposite to the hinge portion 5 side, and is configured to be separable from the holding portion 42 on the hinge portion 5 side. In a case where the door 4 is rotated from an open state to a closed state, the closing portion 41 is configured to be in contact with a peripheral edge portion of the opening 302 on the side opposite to the hinge portion 5 side before the closing portion 41 comes into contact with a peripheral edge portion of the opening 302 on the hinge portion 5 side.

7 Claims, 9 Drawing Sheets (51) Int. Cl.
    *G01N 30/72*     (2006.01)
    *H01J 49/04*     (2006.01)

(56) References Cited

U.S. PATENT DOCUMENTS

2006/0113464 A1    6/2006  Litherland et al.
2011/0204223 A1*  8/2011  Nakano ............... H01J 49/0495
                                                                           250/288

OTHER PUBLICATIONS

Written Opinion for PCT/JP2021/004092 dated Apr. 20, 2021.
Office Action issued May 9, 2023 in Japanese Application No. 2022-522515.
Chinese Office Action dated May 12, 2025 in Application No. 202180020177.6.
Chinese Office Action dated Jan. 22, 2025 in Application No. 202180020177.6.

* cited by examiner

MASS SPECTROMETER

This application is a National Stage of International Application No. PCT/JP2021/004092 filed Feb. 4, 2021, claiming priority based on Japanese Patent Application No. 2020-085214 filed May 14, 2020.

TECHNICAL FIELD

The present invention relates to a mass spectrometer.

BACKGROUND ART

In a mass spectrometer, a sample is analyzed in a vacuum chamber in a vacuum state. The vacuum chamber can be opened and closed by a door, and the vacuum chamber is opened as the door is opened at the time of maintenance or the like (see, for example, Patent Document 1 below).

Figure 4A:
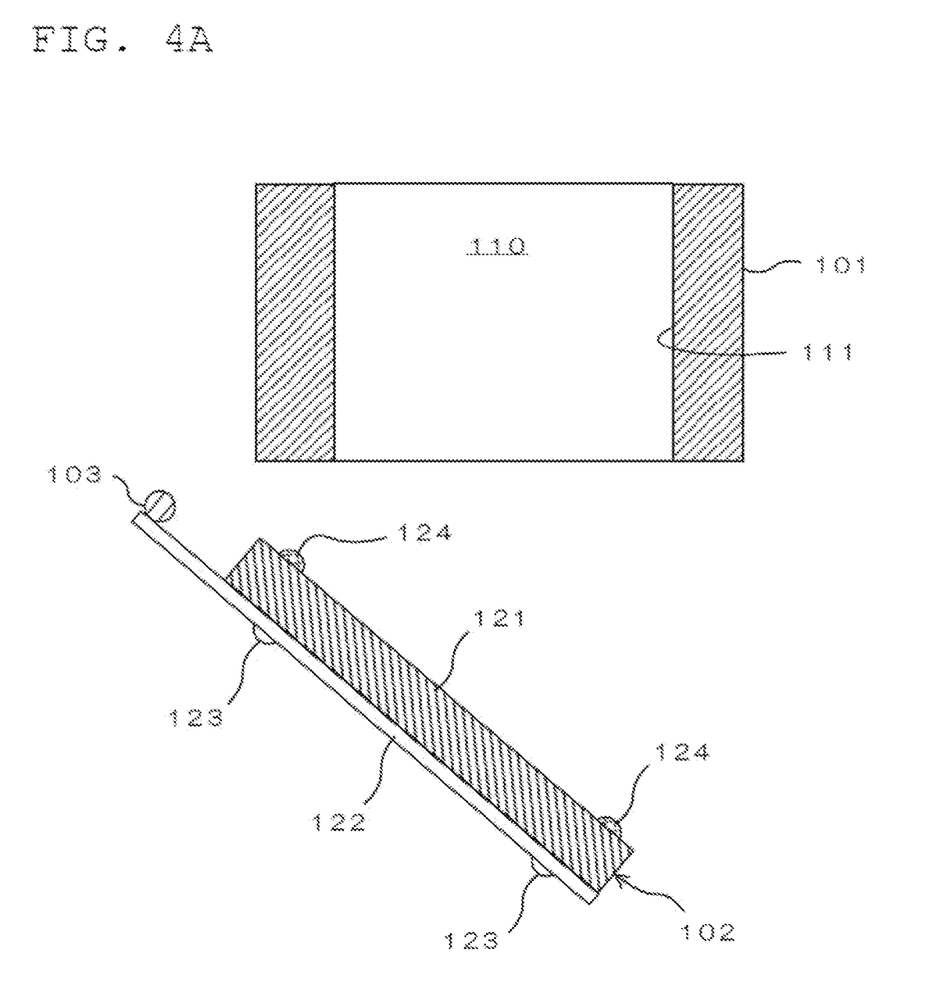
FIG. 4A is a schematic cross-sectional view illustrating a configuration example of a conventional door opening and closing mechanism, and illustrates a state where the door is in an open state.
Figure 4B:
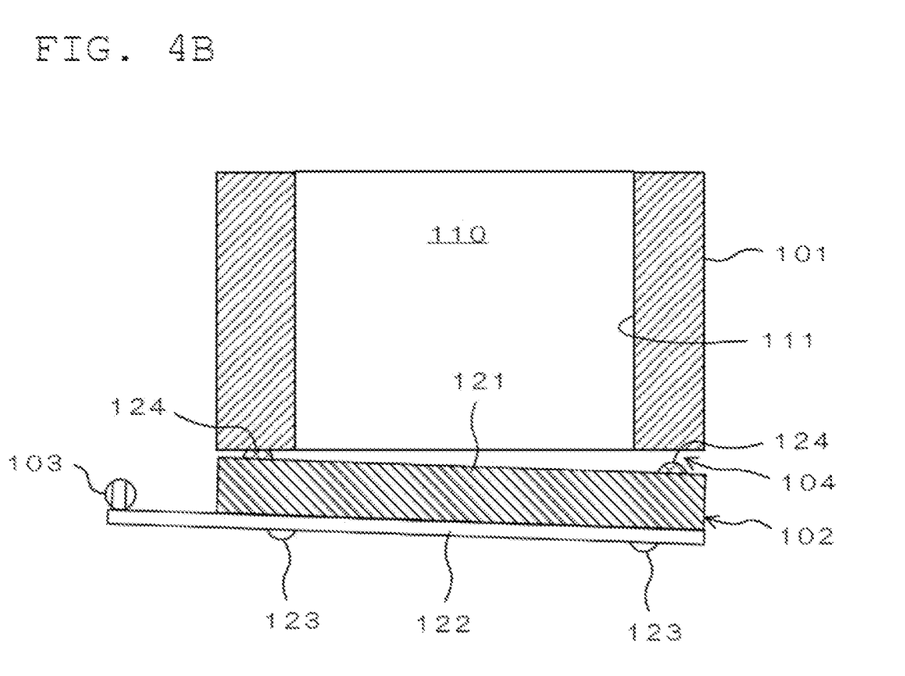
FIG. 4B is a schematic cross-sectional view illustrating a configuration example of the conventional door opening and closing mechanism, and illustrates a state where the door is being rotated from the open state to a closed state.
Figure 4C:
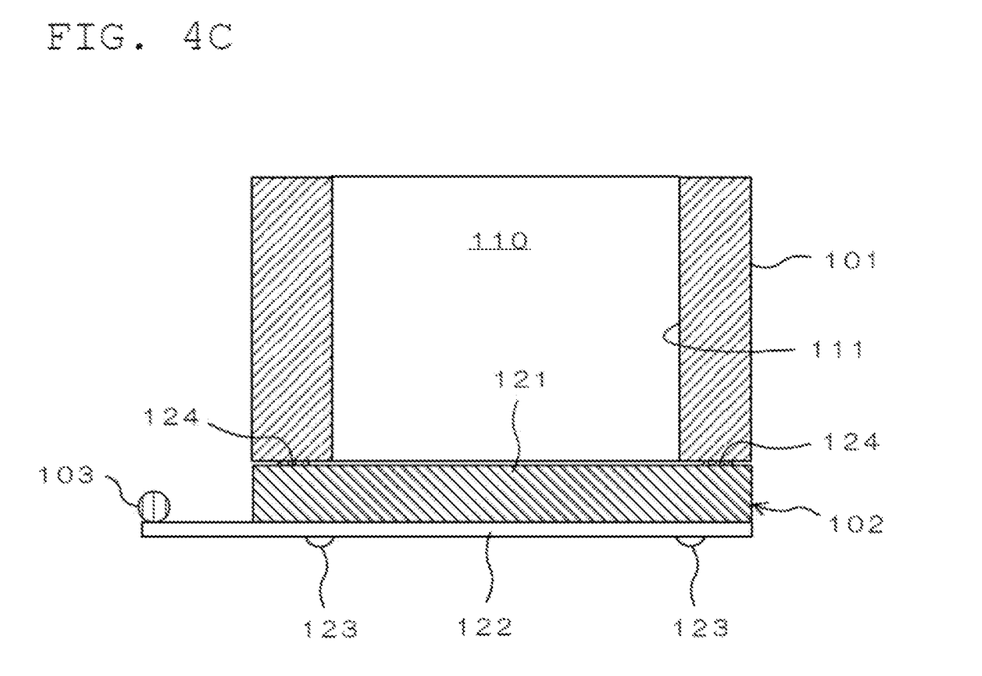
FIG. 4C is a schematic cross-sectional view illustrating a configuration example of the conventional door opening and closing mechanism, and illustrates a state where the door is in the closed state.

FIGS. 4A to 4C are schematic cross-sectional views illustrating a configuration example of an opening and closing mechanism of a conventional door 102. FIG. 4A illustrates a state where the door 102 is open. FIG. 4B illustrates a state where the door 102 is being rotated from the open state to a closed state. FIG. 4C illustrates a state where the door 102 is closed. In this opening and closing mechanism, an opening 111 formed in a housing 101 can be opened and closed by the door 102. The door 102 is rotatably supported by a hinge portion 103 extending in a vertical direction.

The door 102 includes a closing portion 121 and a holding portion 122 that holds the closing portion 121. The hinge portion 103 rotatably supports one end portion of the holding portion 122. The closing portion 121 is fixed to the holding portion 122 with a screw 123 at each of an end portion on the hinge portion 103 side and an end portion on the side opposite to the hinge portion 103 side. In this manner, an entire surface of the closing portion 121 is fixed in a state of being always in close contact with the holding portion 122.

The closing portion 121 includes an O-ring 124 on a surface on the opposite side to the holding portion 122 side. When the door 102 is rotated from the open state illustrated in FIG. 4A to the closed state, as illustrated in FIG. 4B, first, the O-ring 124 comes into contact with a peripheral edge portion of the opening 111 on the hinge portion 103 side. In this state, due to repulsive force of the O-ring 124, the O-ring 124 is separated from a peripheral edge portion of the opening 111 on the side opposite to the hinge portion 103 side.

PRIOR ART DOCUMENT

Patent Document

Patent Document 1: Japanese Patent Laid-Open No. 2003-346703

SUMMARY OF THE INVENTION

Problems to be Solved by the Invention

In a case where a vacuum chamber 110 formed in the housing 101 is to be brought into a vacuum state in the state of FIG. 4B, air enters the vacuum chamber 110 through a gap 104 formed between the O-ring 124 and the peripheral edge portion of the opening 111, and thus it is difficult to bring the vacuum chamber 110 into a vacuum state. For this reason, it is necessary to apply external force to the door 102 against repulsive force of the O-ring 124 to obtain the state as illustrated in FIG. 4C, and then vacuum the vacuum chamber 110. As a means for applying the external force to the door 102, for example, a screw (not illustrated) or the like is used.

The present invention has been made in view of the above circumstances, and an object of the present invention is to provide a mass spectrometer capable of closing an opening communicating with a vacuum chamber with simpler work.

Means for Solving the Problems

A first aspect of the present invention is a mass spectrometer including a housing, a door, and a hinge portion. The housing has a vacuum chamber brought into a vacuum state at the time of analysis formed inside, and an opening communicating with the vacuum chamber. The door opens and closes the opening. The hinge portion is configured to rotatably support the door between an open state and a closed state. The door includes a closing portion that closes the opening in a closed state, and a holding portion that holds the closing portion and is connected to the hinge portion. The closing portion is connected to the holding portion on the side opposite to the hinge portion side, and is configured to be separable from the holding portion on the hinge portion side. In a case where the door is rotated from an open state to a closed state, the closing portion is configured to come into contact with a peripheral edge portion of the opening on the side opposite to the hinge portion side before the closing portion comes into contact with a peripheral edge portion of the opening on the hinge portion side.

Effects of the Invention

According to the first aspect of the present invention, it is possible to bring a closing portion into contact with a peripheral edge portion of an opening on the side opposite to a hinge portion side by rotating a door from an open state to a closed state. Thereafter, it is possible to bring the closing portion into close contact with a peripheral edge portion of the opening on the hinge portion side only by separating the closing portion from a holding portion and bringing the closing portion close to the opening on the hinge portion side. Therefore, it is possible to close the opening communicating with a vacuum chamber by simpler work.

MODE FOR CARRYING OUT THE INVENTION

1. Overall Configuration of Mass Spectrometer

Figure 1:
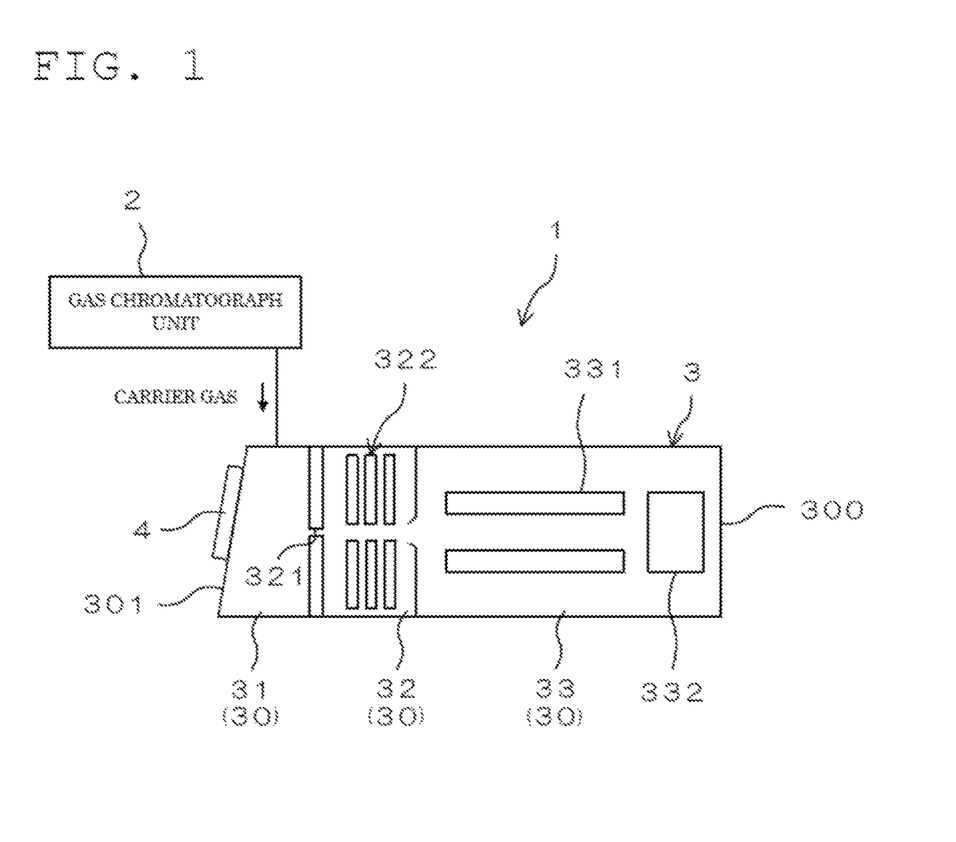
FIG. 1 is a schematic diagram illustrating a configuration example of a mass spectrometer.

FIG. 1 is a schematic diagram illustrating a configuration example of a mass spectrometer 1. The mass spectrometer 1 illustrated in FIG. 1 is a gas chromatograph mass spectrometer that performs mass spectrometry on a component in a sample separated by gas chromatography. The mass spectrometer 1 includes a gas chromatograph unit 2 and a mass spectrometry unit 3.

The gas chromatograph unit 2 includes a column (not illustrated). During analysis, carrier gas is introduced into the column together with a sample, and each component in the sample is separated in a process where the sample passes through the column. Each component in the sample separated in the column is sequentially supplied to the mass spectrometry unit 3. The carrier gas is, for example, inert gas such as nitrogen gas or helium gas, but is not limited to the inert gas, and may be another type of gas such as hydrogen gas.

The mass spectrometry unit 3 includes a hollow housing 300. An ionization chamber 31, a first vacuum chamber 32, and a second vacuum chamber 33 are formed inside the housing 300. The mass spectrometry unit 3 includes a vacuum pump (not illustrated). At the time of analysis, the ionization chamber 31, the first vacuum chamber 32, and the second vacuum chamber 33 can be brought into a vacuum state as the vacuum pump is driven. The ionization chamber 31, the first vacuum chamber 32, and the second vacuum chamber 33 are vacuum chambers 30 communicating with each other, and are configured such that degree of vacuum increases in a stepwise manner in this order.

The carrier gas is supplied from the gas chromatograph unit 2 to the ionization chamber 31 together with each sample component. Each sample component is ionized in the ionization chamber 31. Examples of a method of ionization include, but are not limited to, electron ionization (EI), positive chemical ionization (PCI), negative chemical ionization (NCI), and the like.

The first vacuum chamber 32 communicates with the ionization chamber 31 via an opening 321. Ions generated in the ionization chamber 31 are introduced into the first vacuum chamber 32 through the opening 321. The ions introduced into the first vacuum chamber 32 are converged by an ion guide 322 and flow into the second vacuum chamber 33.

The second vacuum chamber 33 is provided with, for example, a quadrupole filter 331 and a detector 332. The Ions flowing from the first vacuum chamber 32 into the second vacuum chamber 33 are separated according to a mass-to-charge ratio by the quadrupole filter 331, and only the ions having a specific mass-to-charge ratio pass through the quadrupole filter 331. The ions passing through the quadrupole filter 331 are incident on the detector 332. In the detector 332, current corresponding to the number of ions that reach the detector 332 is output as a detection signal.

The mass spectrometry unit 3 is provided with a door 4 for opening and closing the vacuum chamber 30. In this example, the door 4 is attached in an openable and closable manner to a part of a wall surface 301 that partitions the ionization chamber 31 in the housing 300. However, for example, the door 4 may be provided on a wall surface that partitions the vacuum chamber 30 other than the ionization chamber 31, such as the first vacuum chamber 32 or the second vacuum chamber 33.

Hereinafter, the door 4 side of the housing 300 is referred to as the front side, and the side opposite to the door 4 side is referred to as the rear side. The wall surface 301 to which the door 4 is attached is inclined with respect to a vertical direction. Specifically, since a lower portion of the wall surface 301 is positioned further to the front side than an upper portion, the wall surface 301 is inclined to face the upper side than the vertical direction. An inclination angle of the wall surface 301 with respect to the vertical direction can be optionally set within a range of, for example, more than 0° and 90° or less. In this manner, in a state where the door 4 is closed, weight of the door 4 acts on the wall surface 301 of the housing 300.

2. Configuration Around Door

Figure 2:
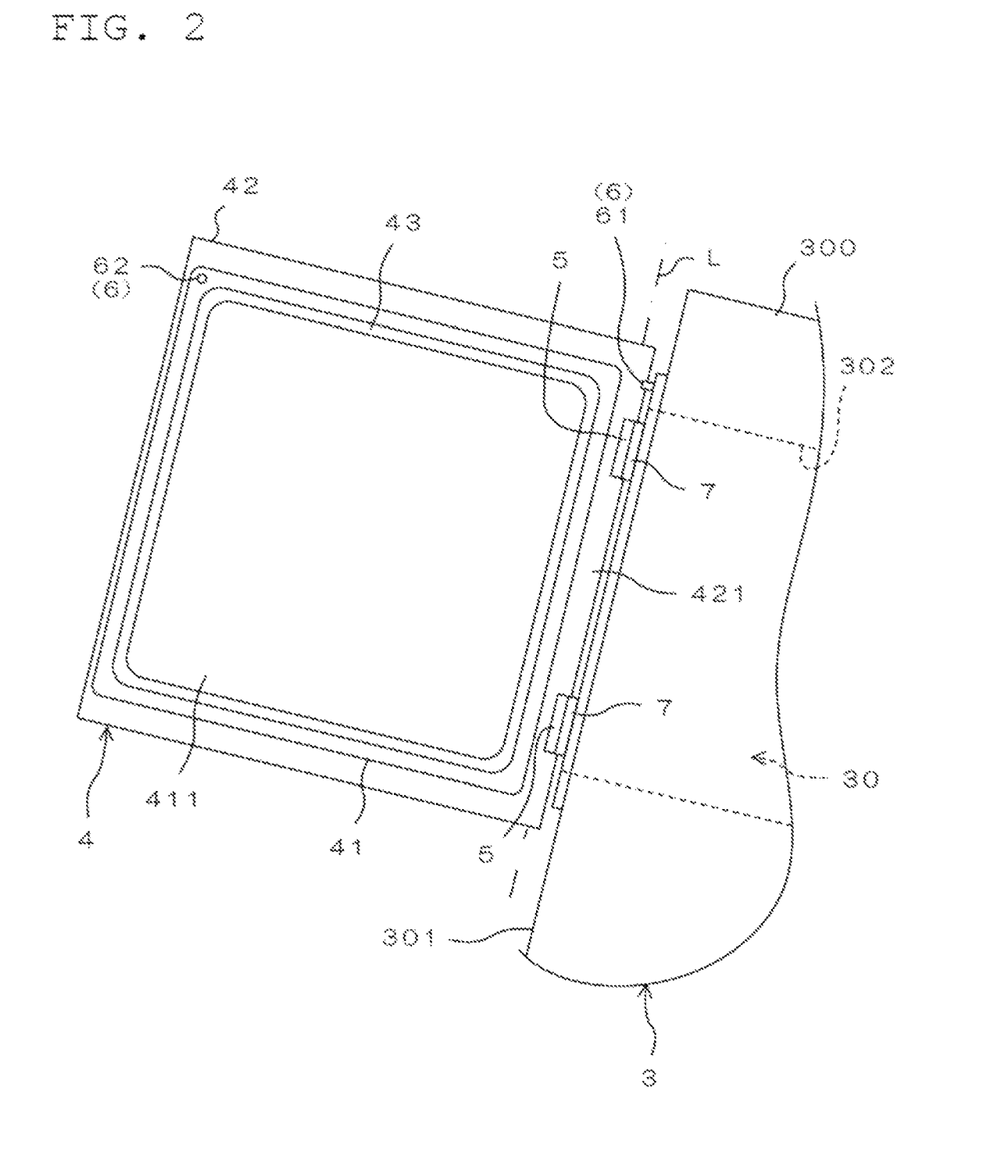
FIG. 2 is a schematic side view for explaining a configuration around a door, illustrating a state in which the door is opened.

FIG. 2 is a schematic side view for explaining a configuration around the door 4, illustrating a state in which the door 4 is opened. As illustrated in FIG. 2, the door 4 is attached in an openable and closable manner to the housing 300 in which the vacuum chamber 30 is formed. Specifically, the door 4 and the housing 300 are connected via one or a plurality of hinge portions 5. The door 4 is openable and closable by rotating about the hinge portion 5. In this example, the door 4 is rotatably supported by the hinge portion 5 about an axis L inclined with respect to the vertical direction. The axis L is inclined in a direction that the upper side of the axis L approaches the housing 300 side (rear side).

An opening 302 for a worker to insert a hand or a tool at the time of maintenance or the like in the housing 300 is formed in the wall surface 301 of the housing 300. The opening 302 is formed in a square shape having a horizontal width and a vertical width of about 10 to 20 cm respectively, for example, but is not limited to such a shape.

The opening 302 communicates with the vacuum chamber 30 and is opened and closed by the door 4. The door 4 is rotatably supported by the hinge portion 5 between an open state in which the opening 302 is opened (a state illustrated in FIG. 2) and a closed state in which the opening 302 is closed by the door 4. An end portion of the door 4 on the side opposite to the hinge portion 5 side is separated from the opening 302 in the open state and approaches the opening 302 in the closed state.

The door 4 includes a closing portion 41 and a holding portion 42. The closing portion 41 is a plate-like member having a planar shape larger than the opening 302, and closes the opening 302 in the closed state. The closing portion 41 can be formed of a material containing, for example, aluminum with a thickness of about 10 to 20 mm, but is not limited to such a configuration.

The closing portion 41 is provided with a seal member 43 on a surface (inner surface 411) on the vacuum chamber 30 side in the closed state. The seal member 43 is composed of an annular O-ring larger than the opening 302 of the housing 300. When the door 4 is in the closed state, the seal member 43 comes into contact with a peripheral edge portion of the opening 302 in the housing 300.

In this example, the closing portion 41 is formed in a rectangular shape. The seal member 43 is formed in a rectangular annular shape, and an outer periphery of the seal member 43 is smaller than an outer periphery of the closing portion 41. The opening 302 of the housing 300 is formed in a rectangular shape smaller than an inner periphery of the seal member 43. However, the opening 302 is not limited to a rectangular shape, and may have another shape such as a circular shape. Further, an optional shape can be employed for the closing portion 41 and the seal member 43 according to the shape of the opening 302.

The holding portion 42 holds the closing portion 41. Specifically, the holding portion 42 is attached in a state of abutting on a surface (outer surface) of the closing portion 41 on the side opposite to the seal member 43 side. The holding portion 42 is formed of, for example, a plate-like member thinner than the closing portion 41. The holding portion 42 can be formed of, for example, a material containing stainless steel or the like with a thickness of about 1 to 2 mm, but is not limited to such a configuration. The holding portion 42 has an overhanging portion 421 formed so as to overhang further to the outer side than the closing portion 41. The hinge portion 5 is connected to the overhanging portion 421 of the holding portion 42.

When the door 4 is rotated from the open state to the closed state, the closing portion 41 is positioned with respect to the opening 302 by a positioning mechanism 6. The positioning mechanism 6 includes, for example, a protruding portion 61 and a recessed portion 62. The protruding portion 61 is formed on a peripheral edge portion of the opening 302 in the housing 300. The recessed portion 62 is formed in a region on the outer side than the seal member 43 on the inner surface 411 of the closing portion 41.

More specifically, the protruding portion 61 is formed in an end portion of a peripheral edge portion of the opening 302 on the side opposite to the hinge portion 5 side. The recessed portion 62 is formed in an end portion of the inner surface 411 of the closing portion 41 on the side opposite to the hinge portion 5 side. An inner diameter of the recessed portion 62 is slightly larger than an outer diameter of the protruding portion 61. When the door 4 is rotated from the open state to the closed state, the protruding portion 61 is inserted into the recessed portion 62, so that the closing portion 41 is positioned on the side opposite to the hinge portion 5 side, and the closing portion 41 is always in the closed state at a fixed position with respect to the opening 302.

The hinge portion 5 is attached to the housing 300 via a spacer 7. The spacer 7 is a plate-like member for adjusting a distance between the housing 300 and the hinge portion 5. By appropriately setting a thickness of the spacer 7, the seal member 43 can be brought into contact with a peripheral edge portion of the opening 302 on the side opposite to the hinge portion 5 side before the seal member 43 comes into contact with a peripheral edge portion of the opening 302 on the hinge portion 5 side when the door 4 is rotated from the open state to the closed state.

3. Opening and Closing Operation of Door

Figure 3A:
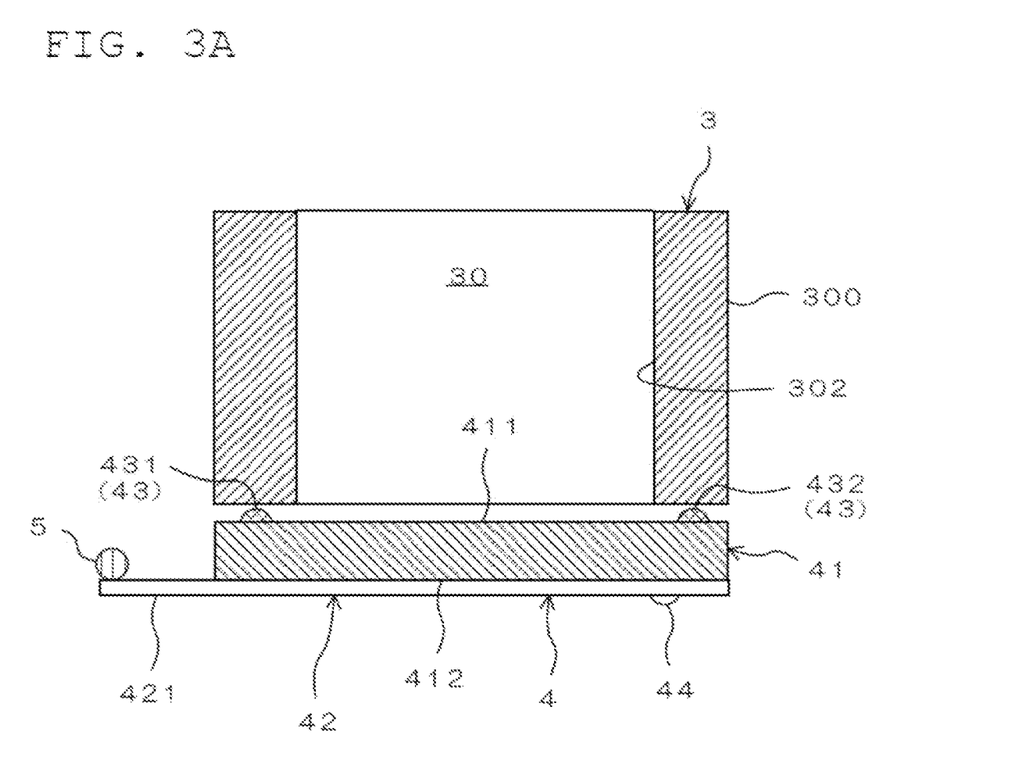
FIG. 3A is a schematic cross-sectional view for explaining opening and closing operation of the door, and illustrates a state before a seal member comes into contact with a peripheral edge portion of an opening.
Figure 3B:
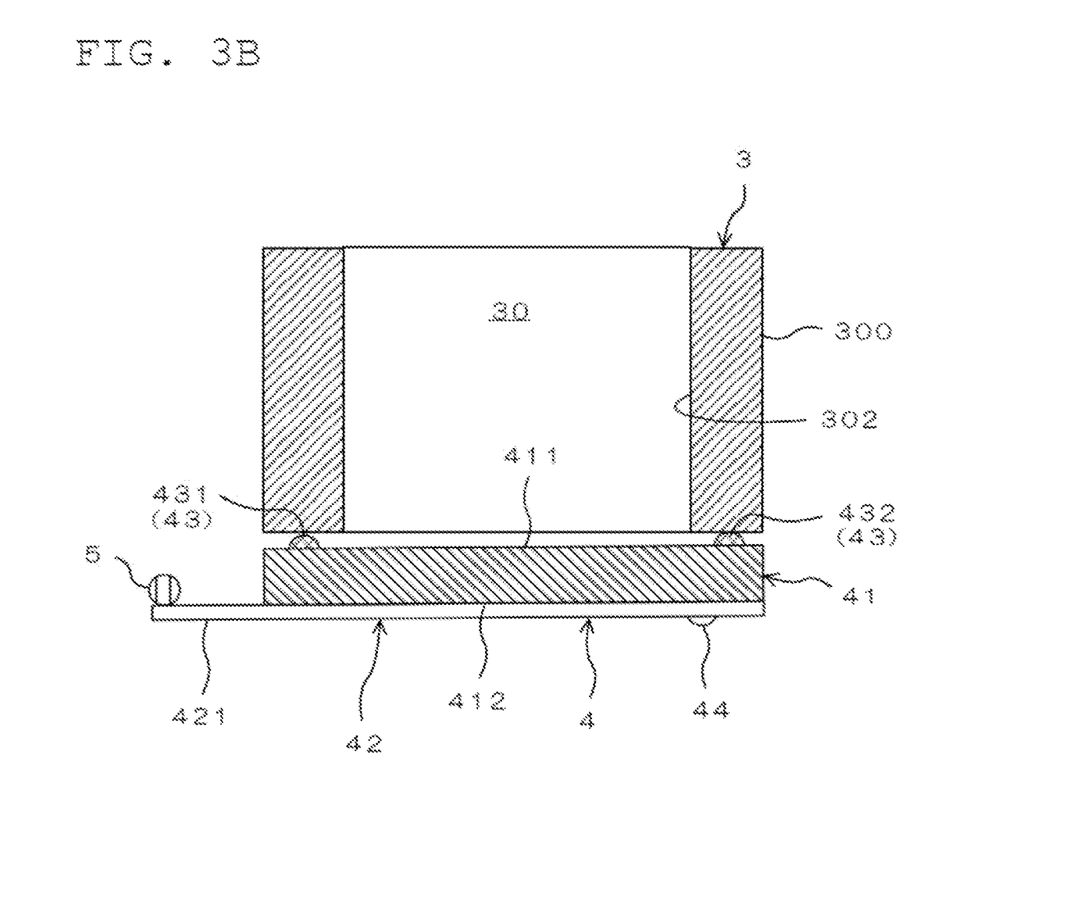
FIG. 3B is a schematic cross-sectional view for explaining the opening and closing operation of the door, and illustrates a state in which the opposite side to the hinge portion side of the seal member is in contact with the peripheral edge portion of the opening.
Figure 3C:
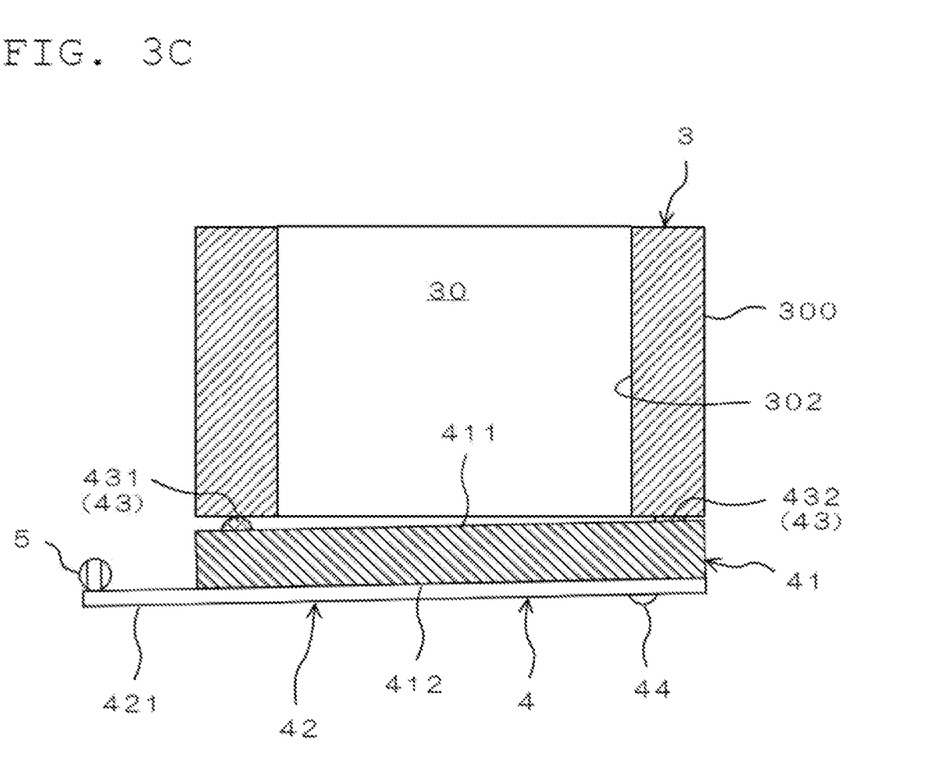
FIG. 3C is a schematic cross-sectional view for explaining the opening and closing operation of the door, and illustrates a state in which the opposite side to the hinge portion side of the seal member is compressed against the peripheral edge portion of the opening.
Figure 3D:
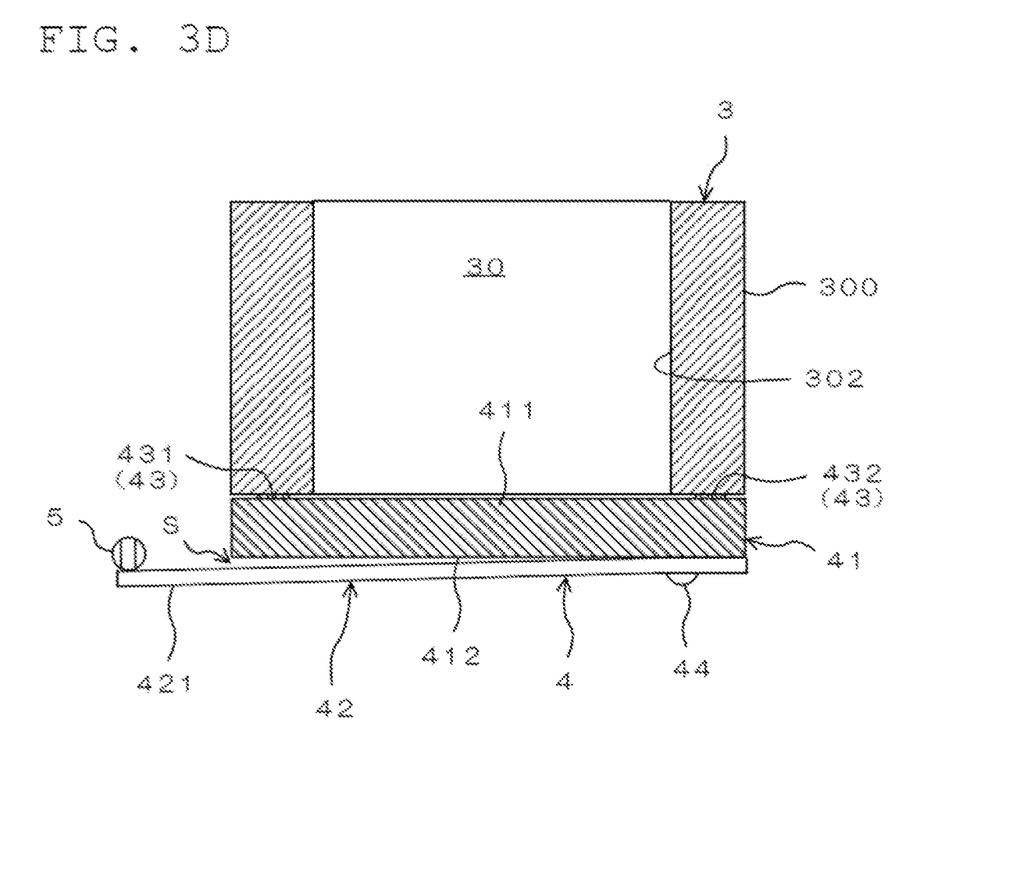
FIG. 3D is a schematic cross-sectional view for explaining the opening and closing operation of the door, and illustrates a state in which the entire seal member is compressed against the peripheral edge portion of the opening.

FIGS. 3A to 3D are schematic cross-sectional views for explaining opening and closing operation of the door 4. FIG. 3A illustrates a state before the seal member 43 comes into contact with a peripheral edge portion of the opening 302. FIG. 3B illustrates a state in which the side of the seal member 43 opposite to the hinge portion 5 side is in contact with a peripheral edge portion of the opening 302. FIG. 3C illustrates a state in which the side of the seal member 43 opposite to the hinge portion 5 side is compressed against the peripheral edge portion of the opening 302. FIG. 3D illustrates a state in which the entire seal member 43 is compressed against the peripheral edge portion of the opening 302.

As illustrated in FIG. 3A, when the door 4 is closed until the inner surface 411 of the closing portion 41 is parallel to the peripheral edge portion of the opening 302, the seal member 43 is not yet in contact with the peripheral edge portion of the opening 302. This is because a position of the hinge portion 5 with respect to the housing 300 is adjusted by the spacer 7 described above. However, it is also possible to adjust a position of the hinge portion 5 with respect to the housing 300 without using the spacer 7.

In the state of FIG. 3A, the closing portion 41 is positioned with respect to the opening 302 by the above-described positioning mechanism 6. When the door 4 is further rotated from this state to the closed state, as illustrated in FIG. 3B, an end portion (second end portion 432) on the side opposite to the hinge portion 5 side comes into contact with the peripheral edge portion of the opening 302 before an end portion (first end portion 431) on the hinge portion 5 side of the seal member 43 comes into contact therewith. In this state, the first end portion 431 of the seal member 43 is not in contact with the peripheral edge portion of the opening 302. However, when the door 4 is slightly rotated further to the closed state and the second end portion 432 of the seal member 43 is compressed, the first end portion 431 of the seal member 43 is also in contact with the peripheral edge portion of the opening 302 as illustrated in FIG. 3C.

In the state of FIG. 3C, the entire circumference of the seal member 43 is in contact with the peripheral edge portion of the opening 302. Therefore, if a vacuum pump is driven in this state, the vacuum chamber 30 can be evacuated. At this time, when the closing portion 41 is in a state of being completely fixed to the holding portion 42, the inner surface 411 of the closing portion 41 is not parallel to the peripheral edge portion of the opening 302, and only the second end portion 432 side of the seal member 43 is in a state of being compressed while the first end portion 431 of the seal member 43 is not sufficiently compressed.

In order to prevent such a non-uniform compressed state of the seal member 43, in the present embodiment, the closing portion 41 is connected to the holding portion 42 on the side opposite to the hinge portion 5 side, and is configured to be separable from the holding portion 42 on the hinge portion 5 side. Specifically, the closing portion 41 is fixed to the holding portion 42 only at an end portion on the side opposite to the hinge portion 5 side.

In this example, a connector 44 such as a screw connects the closing portion 41 and the holding portion 42 to each other on the side opposite to the hinge portion 5 side, but the closing portion 41 and the holding portion 42 are not connected to each other on the hinge portion 5 side. Therefore, when force is applied in a direction in which an end portion of the closing portion 41 on the hinge portion 5 side approaches the housing 300, the closing portion 41 rotates toward the housing 300 side about the connector 44, and a gap S is formed between an outer surface 412 of the closing portion 41 and the holding portion 42 as illustrated in FIG.

3D. At this time, the holding portion 42 is bent in the vicinity of the connector 44 along with the rotation of the closing portion 41. The gap S is, for example, about 1 to 2 mm, but is not limited to this size.

Note that "the side opposite to the hinge portion 5 side" means the side opposite to the hinge portion 5 side as viewed from the closing portion 41, and is, for example, a region including a portion that first comes into contact with the peripheral edge portion of the opening 302 when the closing portion 41 rotates about the hinge portion 5 in a case where the closing portion 41 is configured not to be separated from the holding portion 42. On the other hand, the "hinge portion 5 side" means the hinge portion 5 side as viewed from the closing portion 41, and is, for example, a region closer to the hinge portion 5 than a region on the side opposite to the hinge portion 5 side, and is a region including a portion that comes into contact with the peripheral edge portion of the opening 302 when the closing portion 41 is separated from the holding portion 42. For example, with respect to the center of the closing portion 41 in a lateral direction (left-right direction in FIGS. 3A to 3D), the left side may be the "hinge portion 5 side" and the right side may be the "side opposite to the hinge portion 5 side".

In the present embodiment, since the axis L of the hinge portion 5 is inclined as illustrated in FIG. 2, the closing portion 41 rotates about the connector 44 toward the housing 300 side due to weight of the closing portion 41 from the state of FIG. 3C. As a result, as illustrated in FIG. 3D, the entire seal member 43 (the first end portion 431 and the second end portion 432) is compressed to be in close contact with the peripheral edge portion of the opening 302, and the inner surface 411 of the closing portion 41 becomes parallel to the peripheral edge portion of the opening 302.

4. Variation

The positioning mechanism 6 is not limited to the configuration including the protruding portion 61 provided on the housing 300 and the recessed portion 62 provided on the closing portion 41. For example, the configuration may be such that the protruding portion 61 is provided on the closing portion 41 and the recessed portion 62 is provided on the housing 300. Alternatively, the protruding portion 61 or the recessed portion 62 may be provided on a portion (for example, the holding portion 42) other than the closing portion 41 on the door 4. Furthermore, the configuration may be such that the door 4 is positioned using another member such as a magnet without limitation to the protruding portion 61 and the recessed portion 62.

The configuration of the seal member 43 is not limited to one in which the seal member 43 is provided on the closing portion 41 of the door 4, and may be one in which the seal member 43 is provided on the peripheral edge portion of the opening 302. In this case, when the door 4 is rotated from the open state to the closed state, the closing portion 41 may be configured to come into contact with the seal member 43 on the side opposite to the hinge portion 5 side before the closing portion 41 comes into contact with the seal member 43 provided on a peripheral edge portion of the opening 302 on the hinge portion 5 side.

The configuration of the door 4 is not limited to the configuration in which the door 4 is rotatable about the axis L inclined in a front-rear direction with respect to the vertical direction. For example, the door 4 may be configured to be rotatable about an axis extending in a horizontal direction at an upper end portion or a lower end portion of the door 4.

The configuration of the closing portion 41 is not limited to the configuration in which the closing portion 41 can be separated from the holding portion 42 as the holding portion 42 is elastically deformed. For example, even when the closing portion 41 is configured to be connected to the holding portion 42 via another hinge portion (not illustrated) on the side opposite to the hinge portion 5 side, the closing portion 41 can be separated from the holding portion 42 on the hinge portion 5 side.

The configuration of the closing portion 41 is not limited to the configuration in which the closing portion 41 is rotatable toward the housing 300 side by its own weight with respect to the holding portion 42. For example, the configuration may be such that an end portion of the closing portion 41 on the hinge portion 5 side can be separated from the holding portion 42 by using the force other than gravity, such as magnetic force generated by using a magnet, and the end portion can be brought closer to the housing 300. Alternatively, an end portion of the closing portion 41 on the hinge portion 5 side may be separated from the holding portion 42 by the user applying force in a direction in which the end portion approaches the housing 300.

5. Aspect

It is to be understood by those skilled in the art that a plurality of exemplary embodiments described above are specific examples of an aspect described below.

(Clause 1) A mass spectrometer according to one aspect includes:
- a housing in which a vacuum chamber brought into a vacuum state at the time of analysis is formed, the housing having an opening communicating with the vacuum chamber;
- a door for opening and closing the opening; and
- a hinge portion configured to rotatably support the door between an open state and a closed state, wherein
- the door includes a closing portion that closes the opening in a closed state, and a holding portion that holds the closing portion and is connected to the hinge portion,
- the closing portion is connected to the holding portion on the side opposite to the hinge portion side, and is configured to be separable from the holding portion on the hinge portion side, and
- in a case where the door is rotated from an open state to a closed state, the closing portion is configured to come into contact with a peripheral edge portion of the opening on the side opposite to the hinge portion side before the closing portion comes into contact with the peripheral edge portion of the opening on the hinge portion side.

According to the mass spectrometer described in Clause 1, the closing portion can be brought into contact with a peripheral edge portion of the opening on the side opposite to the hinge portion side by rotating the door from the open state to the closed state. Thereafter, it is possible to bring the closing portion into close contact with a peripheral edge portion of the opening on the hinge portion side only by separating the closing portion from a holding portion and bringing the closing portion close to the opening on the hinge portion side. Therefore, it is possible to close the opening communicating with a vacuum chamber by simpler work.

(Clause 2) In the mass spectrometer according to Clause 1,
- in a case where the door is rotated from an open state to a closed state, the closing portion may be configured to come into close contact with the peripheral edge portion of the opening on the hinge portion side by own weight of the closing portion after the closing portion comes into contact with a peripheral edge portion of the opening on the side opposite to the hinge portion side.

According to the mass spectrometer described in Clause 2, due to own weight of the closing portion, the closing portion can be separated from the holding portion on the hinge portion side and brought close to the opening, and the closing portion can be automatically brought into close contact with the peripheral edge portion of the opening on the hinge portion side. Therefore, it is possible to close the opening communicating with the vacuum chamber by simpler work without providing an additional configuration.

(Clause 3) In the mass spectrometer according to Clause 2, the hinge portion may be configured to rotatably support the door about an axis inclined in a direction in which the upper side of the axis approaches the housing side.

According to the mass spectrometer described in Clause 3, the closing portion can be smoothly separated from the holding portion by its own weight and brought close to the opening about the axis, and the closing portion can be automatically brought into close contact with the peripheral edge portion of the opening on the hinge portion side.

(Clause 4) In the mass spectrometer according to any one of Clauses 1 to 3, in a case where the door is rotated from an open state to a closed state, the closing portion may be configured to come into close contact with the peripheral edge portion of the opening on the hinge portion side as the holding portion bends after the closing portion comes into contact with the peripheral edge portion of the opening on the side opposite to the hinge portion side.

According to the mass spectrometer described in Clause 4, it is possible to realize a configuration in which the closing portion can be separated from the holding portion on the hinge portion side by using elastic deformation of the holding portion.

(Clause 5) In the mass spectrometer according to any one of Clauses 1 to 4, the closing portion may include a seal member that comes into contact with a peripheral edge portion of the opening in a closed state, and in a case where the door is rotated from an open state to a closed state, the seal member may be configured to come into contact with the peripheral edge portion of the opening on the side opposite to the hinge portion side before the seal member comes into contact with the peripheral edge portion of the opening on the hinge portion side.

According to the mass spectrometer described in Clause 5, the seal member can be brought into contact with the peripheral edge portion of the opening on the side opposite to the hinge portion side by rotating the door from the open state to the closed state. Thereafter, it is possible to bring the seal member into close contact with the peripheral edge portion of the opening on the hinge portion side only by separating the closing portion from the holding portion and bringing the closing portion close to the opening on the hinge portion side. Therefore, it is possible to close the opening communicating with the vacuum chamber by the seal member by simpler work.

(Clause 6) The mass spectrometer according to any one of Clauses 1 to 5 may further include a positioning mechanism that positions the closing portion on the side opposite to the hinge portion side when the door is rotated from an open state to a closed state.

According to the mass spectrometer described in Clause 6, when the door is rotated from the open state to the closed state, the closing portion is always in the closed state at a fixed position with respect to the opening, so that the vacuum chamber can be reliably sealed to be in the vacuum state.

DESCRIPTION OF REFERENCE SIGNS 1 mass spectrometer
4 door
5 hinge portion
6 positioning mechanism
30 vacuum chamber
41 closing portion
42 holding portion
43 seal member
300 housing
302 opening
L axis

The invention claimed is:

1. A mass spectrometer, comprising:
a housing in which a vacuum chamber brought into a vacuum state at a time of analysis is formed, the housing having an opening communicating with the vacuum chamber;
a door for opening and closing the opening, the door being rotatably attached to a part of a wall surface that partitions the vacuum chamber in the housing; and
a hinge portion configured to rotatably support the door between an open state and a closed state, wherein
the door includes a closing portion that closes the opening in a closed state, and a holding portion that holds the closing portion and is connected to the hinge portion,
the closing portion is connected to the holding portion on a side opposite to the hinge portion side, and is configured to be separable from the holding portion on the hinge portion side, and
in a case where the door is rotated from an open state to a closed state, the closing portion is configured to come into contact with a peripheral edge portion of the opening on a side opposite to the hinge portion side before the closing portion comes into contact with a peripheral edge portion of the opening on the hinge portion side, and
in a case where the door is rotated from an open state to a closed state, the closing portion is configured to come into close contact with the peripheral edge portion of the opening on the hinge portion side by own weight of the closing portion after the closing portion comes into contact with the peripheral edge portion of the opening on the side opposite to the hinge portion side.

2. The mass spectrometer according to claim 1, wherein the hinge portion is configured to rotatably support the door about an axis inclined in a direction in which an upper side of the axis approaches the housing side.

3. The mass spectrometer according to claim 1, wherein in a case where the door is rotated from an open state to a closed state, the closing portion is configured to come into close contact with the peripheral edge portion of the opening on the hinge portion side as the holding portion bends after the closing portion comes into contact with the peripheral edge portion of the opening on the side opposite to the hinge portion side.

4. The mass spectrometer according to claim 1, wherein the closing portion includes a seal member that comes into contact with a peripheral edge portion of the opening in a closed state, and
in a case where the door is rotated from an open state to a closed state, the seal member is configured to come into contact with the peripheral edge portion of the opening on the side opposite to the hinge portion side before the seal member comes into contact with the peripheral edge portion of the opening on the hinge portion side.

5. The mass spectrometer according to claim 1, further comprising a positioning mechanism that positions the closing portion on the side opposite to the hinge portion side when the door is rotated from an open state to a closed state.

6. A mass spectrometer, comprising:

a housing in which a vacuum chamber brought into a vacuum state at a time of analysis is formed, the housing having an opening communicating with the vacuum chamber;

a door for opening and closing the opening, the door being rotatably attached to a part of a wall surface that partitions the vacuum chamber in the housing; and a hinge configured to rotatably support the door between an open state and a closed state, in a case where the door is rotated from an open state to a closed state, a part of the door on a side opposite to the hinge contacts a peripheral edge of the opening before a part of the door on a side proximate to the hinge contacts the peripheral edge of the opening, and in a case where the door is rotated from an open state to a closed state, the part of the door on the side proximate to the hinge comes into close contact with the peripheral edge of the opening by the weight of the door after the part of the door on the side opposite to the hinge contacts the peripheral edge of the opening.

7. The mass spectrometer according to claim 6, wherein the hinge is configured to rotatably support the door about an axis inclined in a direction in which an upper side of the axis approaches the housing side.

* * * * *